United States Patent [19]

Stewart

[11] Patent Number: 4,898,482
[45] Date of Patent: * Feb. 6, 1990

[54] REPLACEABLE SHIM

[76] Inventor: Matthew M. Stewart, 26468 Hickory Blvd., Bonita Beach, Fla. 33923

[*] Notice: The portion of the term of this patent subsequent to Oct. 4, 2005 has been disclaimed.

[21] Appl. No.: 252,785

[22] Filed: Oct. 3, 1988

Related U.S. Application Data

[63] Continuation-in-part of Ser. No. 57,328, Jun. 4, 1987, Pat. No. 4,775,250.

[51] Int. Cl.$^4$ .................. F16C 33/00; F16H 35/08; F16B 43/00
[52] U.S. Cl. .................. 384/626; 74/401; 403/365; 403/409.1; 411/532; 411/536
[58] Field of Search ........... 384/626, 602, 420, 425, 384/427, 127; 74/409, 401, 801; 403/409.1, 365; 411/531-547

[56] References Cited

U.S. PATENT DOCUMENTS

| | | | |
|---|---|---|---|
| 1,556,940 | 10/1925 | Leis | 384/250 |
| 2,473,307 | 6/1949 | Seipt et al. | 384/626 |
| 2,713,806 | 7/1955 | Dodge | 411/536 |
| 2,980,572 | 4/1961 | Bagdon et al. | 156/288 |
| 3,730,600 | 5/1973 | Degnan | 384/626 |
| 4,222,290 | 9/1980 | Helmer et al. | 74/801 |
| 4,775,250 | 10/1988 | Stewart | 384/626 |

Primary Examiner—Thomas R. Hannon
Attorney, Agent, or Firm—Gifford, Groh, Sheridan, Sprinkle and Dolgorukov

[57] ABSTRACT

A shim is provided for a planetary gear arrangement of the type having planetary gears each of which is rotatably mounted to a frame by a shaft. The shim includes an elongated flat body having a generally U-shaped recess at one end and which is adapted to be inserted in between the planetary gear and the frame so that the shaft is positioned within the U-shaped recess. The opposite end of the shim includes a locking tab which abuts against a portion of the frame thus simultaneously locking the shim against pivotal movement and locking the shaft in the U-shaped recess on the shim body. The U-shaped shim serves to channel lubrication into the shim and around the shaft.

5 Claims, 1 Drawing Sheet

REPLACEABLE SHIM

CROSS REFERENCE TO RELATED APPLICATIONS

This application is a continuation-in-part of U.S. pat. application Ser. No. 057,328, filed June 4, 1987, entitled REPLACEABLE SHIM with Matthew Stewart as the Inventor now U.S. Pat. No. 4,775,250 issued Oct. 4, 1988.

BACKGROUND OF THE INVENTION

I. Field of the Invention

The present invention relates generally to shims and, more particularly, to a shim for a planetary gear arrangement.

II. Description of the Prior Art

Many automotive transmissions include planetary gear arrangements in which a plurality of planetary gears are each rotatably mounted to a frame by individual shafts. These shafts in turn are fixedly secured to the frame for the planetary gear arrangement. An annular shim is conventionally positioned around the shaft in between each end of the planetary gear arrangement and its frame.

After prolonged use, however, the shims on the planetary gear arrangement become worn and ultimately require replacement. The deterioration of the shims is further hastened since only minimal lubrication reaches the shaft adjacent the shims. The replacement of these shims, however, has been a difficult and expensive procedure.

More specifically, in order to replace the shims in the planetary gear arrangement, it has been the previous practice to remove the frame together with the planetary gears from the transmission. The shaft is then pressed out of the frame which allows new shims to be inserted in between the ends of the planetary gear and the frame. Thereafter, the shaft is repressed back into place in the frame and the planetary gear arrangement is ultimately reinstalled in the transmission.

Since the above procedure to replace the shims in the planetary gear arrangement not only requires removal of the planetary gear arrangement from the transmission, but also requires specialized and expensive equipment in order to temporarily remove the planetary gears from their frame and thereafter replace the planetary gears in the frame, such an operation has been previously very expensive to perform. In some cases, it is simpler and less expensive to simply replace the entire planetary gear arrangement rather than to repair it even though only a relatively inexpensive shim requires replacement.

SUMMARY OF THE PRESENT INVENTION

The present invention provides a longlasting shim for a planetary gear arrangement which overcomes all the above mentioned disadvantages of the previously known devices.

In brief, the shim of the present invention comprises an elongated and flat body having a generally U-shaped recess formed at one end. The U-shaped recess has a width designed to fit around the shaft in the planetary gear arrangement while the thickness of the body is the same thickness as the desired shim. In order to install the replacement shim of the present invention in the planetary gear arrangement, the shim is positioned in between the planetary gear and the frame so that the shaft for the planetary gear is nested in the U-shaped recess.

The shim is then positioned so that its opposite end abuts against a first surface on the planetary gear frame which prevents pivotal movement of the shim in that rotational direction. A locking tab at the opposite end of the shim simultaneously abuts against a second surface on the planetary gear frame and prevents pivotal movement of the shim with respect to the frame. In this fashion, the locking tab, together with the first surface on the shim locks the bearing shim against rotation with respect to the planetary gear frame and thus locks the shim in position between the end of the planetary gear and the planetary gear frame.

The shim of the present invention is oriented with respect to the frame so that the U-shaped channel faces in the usual direction of rotation of the planetary gear. Thus, the U-shaped channel serves to channel lubricant in around the shim and shaft and protect the shim from wear.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
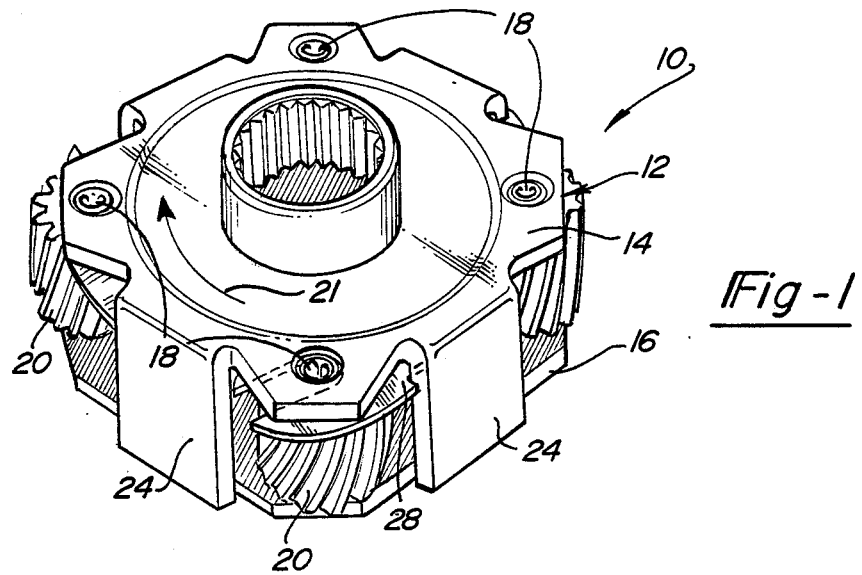
FIG. 1 is a perspective view illustrating a planetary gear arrangement utilizing a preferred embodiment of the shim of the present invention.

With reference first to FIG. 1, a planetary gear arrangement 10 is thereshown having a frame 12 having two plates 14 and 16 which are spaced apart and generally parallel to each other. A plurality of shafts 18 extend between and are secured to the plates 14 and 16 and the shafts 18 are circumferentially spaced from each other around the frame 12.

A planetary gear 20 is rotatably mounted to each shaft 18 so that the planetary gears 20 are sandwiched in between the frame plates 14 and 16. In addition, the entire planetary gear arrangement 10 normally rotates in the transverse direction of arrow 21 in operation.

In order to secure the plates 14,16 in a spaced apart and parallel relationship, a plurality of cross members 24 extend in between and are fixedly secured to the plates 14 and 16. Preferably, one cross member 24 extends between the plates 14 and 16 between each adjacent pair of planetary gears 20.

Figure 2:
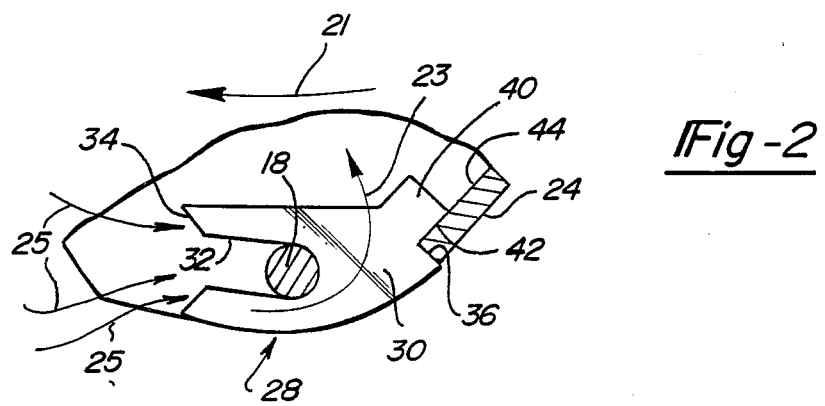
FIG. 2 is a partial sectional view taken substantially along line 2—2 in FIG. 1.

With reference now to FIGS. 1 and 2, the shim 28 of the present invention comprises an elongated and generally flat body 30 having a generally U-shaped recess 32 at one end 34. This recess 32 has a width substantially the same as the shaft 18 so that the shim 28 can be positioned as shown in FIG. 2 in which the shaft 18 nests at the bottom of the recess 32. Furthermore, as shown in FIG. 2, the shim 28 can be inserted into the planetary gear arrangement 10 so that the recess 32 is positioned around the shaft 18.

With reference now particularly to FIG. 2, the 28 is inserted over the shaft 18 in between the gear 20 and the plate 16 so that the end 36 of the shim body 30 abuts against the cross member 24 thus preventing pivotal movement of the shim 28 in the counterclockwise direction indicated by arrow 23. Furthermore, the surface 36 faces away from or in the opposite direction from the recess 32 so that the shim 28 is wedged or constrained in between the shaft 18 and the cross member 34.

As best shown in FIG. 2, a locking tab 40 is integrally formed with the shim body 30 and is coplanar with the shim body 30. With the locking tab 40 in a position shown in FIG. 2, a surface 42 on the locking tab 40 abuts against an inside surface 44 of the cross member 24 thereby preventing pivotal movement of the shim 28 in a direction opposite from arrow 23 as viewed in FIG. 2.

The open end 34 of the U-shaped recess 32 faces in the same direction as the normal direction of rotation of the planetary gear arrangement 10. Consequently, in operation, the U-shaped recess 32 serves to channel lubrication around the shaft 18 and shim 28 as indicated by arrows 25 thereby protecting the shim 28 from wear and deterioration.

Having described my invention, however, many modifications thereto will become apparent to those skilled in the art to which it pertains without deviation from the spirit of the invention as defined by the scope of the appended claims.

I claim:

1. For use in conjunction with a member rotatably mounted to a shaft, said shaft being secured to a frame, said shaft normally moving in a predetermined transverse direction, a shim comprising:
   a flat body having a recess with an open end, said body being insertable between said frame and said rotary member so that said shaft is positioned within said recess, and
   means for locking said body to said frame so that said open end of said recess faces in said predetermined transverse direction, and so that said shaft remains in said recess comprising a surface on said body adapted to abut against a surface on said frame, said body surface being spaced from and facing substantially away from said recess; wherein said body and said locking means are of one-piece construction.

2. The invention as defined in claim 1 and further comprising a tab on said body, wherein said tab abuts against a second surface on said frame and prevents further pivoting of said body about said recess.

3. The invention as defined in claim 2 wherein said first and second frame surfaces are substantially perpendicular to each other.

4. The invention as defined in claim 2 wherein said first and second frame surfaces meet at a corner.

5. The invention as defined in claim 1 wherein said recess is U-shaped.

* * * * *